United States Patent
Bentner et al.

(10) Patent No.: US 8,352,144 B2
(45) Date of Patent: Jan. 8, 2013

(54) METHOD FOR CONTROLLING AN ELECTROMECHANICAL PARKING BRAKE SYSTEM OF A VEHICLE AND CORRESPONDING SYSTEM

(75) Inventors: Johannes Bentner, Pentling (DE); Alexander Kalbeck, Burglengenfeld (DE)

(73) Assignee: Continental Automotive GmbH, Hannover (DE)

(*) Notice: Subject to any disclaimer, the term of this patent is extended or adjusted under 35 U.S.C. 154(b) by 82 days.

(21) Appl. No.: 12/680,613

(22) PCT Filed: Sep. 12, 2008

(86) PCT No.: PCT/EP2008/062135
§ 371 (c)(1),
(2), (4) Date: Jun. 23, 2010

(87) PCT Pub. No.: WO2009/043702
PCT Pub. Date: Apr. 9, 2009

(65) Prior Publication Data
US 2010/0268430 A1    Oct. 21, 2010

(30) Foreign Application Priority Data
Sep. 28, 2007 (DE) .......................... 10 2007 046 484

(51) Int. Cl.
*B60T 7/12* (2006.01)
*B60T 7/02* (2006.01)
(52) U.S. Cl. .......................................................... 701/70
(58) Field of Classification Search ...................... 701/70
See application file for complete search history.

(56) References Cited

U.S. PATENT DOCUMENTS

| | | | | |
|---|---|---|---|---|
| 5,139,315 | A | * | 8/1992 | Walenty et al. ............... 303/162 |
| 6,000,507 | A | | 12/1999 | Böhm et al. .................. 188/158 |
| 6,019,436 | A | | 2/2000 | Siepker ........................... 303/13 |
| 6,178,369 | B1 | | 1/2001 | Böhm ............................. 701/70 |
| 6,447,074 | B2 | * | 9/2002 | Engelhard ........................ 303/3 |
| 6,496,768 | B2 | * | 12/2002 | Yamamoto ...................... 701/70 |
| 6,626,271 | B1 | * | 9/2003 | Bohm et al. .................. 188/158 |
| 6,802,401 | B1 | | 10/2004 | Bohm et al. .................. 188/158 |
| 2004/0140710 | A1 | * | 7/2004 | Alvarez et al. .................. 303/20 |

(Continued)

FOREIGN PATENT DOCUMENTS
DE    19536694 A1    4/1997

(Continued)

OTHER PUBLICATIONS

JPO Machine Translation of JP 3509700 B.*

(Continued)

*Primary Examiner* — James Trammell
*Assistant Examiner* — David Testardi
(74) *Attorney, Agent, or Firm* — King & Spalding L.L.P.

(57) ABSTRACT

In a method for controlling an electromechanical parking brake system (EPB) of a vehicle, wherein the electromechanical parking brake system (EPB) comprises at least one actuating element (BE), at least one brake mechanism unit (BME), and at least one control device (SG), in order to statically brake the vehicle, the actuating element (BE) is actuated and, depending thereon, the at least one brake mechanism unit (BME) is applied with a predetermined application speed (AV) controlled by a control and evaluation routine (SAR) run in the control device (SG). The vehicle speed (V) prevailing when the at least one actuating element (BE) is actuated is advantageously determined and the application speed (AV) of the brake mechanism unit (BME) is selected depending on the determined vehicle speed.

17 Claims, 3 Drawing Sheets

U.S. PATENT DOCUMENTS

2006/0049691 A1* 3/2006 Deprez et al. .................. 303/191
2006/0225971 A1* 10/2006 Jaeger ........................ 188/106 P

FOREIGN PATENT DOCUMENTS

| | | | |
|---|---|---|---|
| DE | 19632863 | A1 | 2/1998 |
| DE | 19703838 | A1 | 8/1998 |
| DE | 19836687 | A1 * | 8/1999 |
| DE | 19935999 | A1 | 2/2001 |
| DE | 10351589 | | 6/2005 |
| DE | 102005021492 | A1 | 11/2006 |
| DE | 102006009729 | A1 | 9/2007 |
| JP | 07101319 | A * | 4/1995 |
| JP | 08099613 | A * | 4/1996 |
| JP | 10329684 | A * | 12/1998 |
| JP | 2001106045 | A * | 4/2001 |
| JP | 2001187564 | A * | 7/2001 |
| JP | 3509700 | B * | 1/2004 |
| WO | 00/73114 | A1 | 12/2000 |
| WO | 0073114 | | 12/2000 |
| WO | WO 2006053888 | A1 * | 5/2006 |

OTHER PUBLICATIONS

EPO Machine Translation of DE 19836687 A.*
International Search Report and Written Opinion for Application No. PCT/EP2008/062135 (11 pages), Feb. 26, 2009.
Chinese Office Action, Chinese Patent Application No. 200880118007.6, 26 pages, Jun. 5, 2012.
International PCT Search Report and Written Opinion, PCT/EP2008/062135, 11 pages, Feb. 26, 2009.

* cited by examiner

METHOD FOR CONTROLLING AN ELECTROMECHANICAL PARKING BRAKE SYSTEM OF A VEHICLE AND CORRESPONDING SYSTEM

CROSS-REFERENCE TO RELATED APPLICATIONS

This application is a U.S. National Stage Application of International Application No. PCT/EP2008/062135 filed Sep. 12, 2008, which designates the United States of America, and claims priority to German Application No. 10 2007 046 484.5 filed Sep. 28, 2007, the contents of which are hereby incorporated by reference in their entirety.

TECHNICAL FIELD

The invention relates to a method for controlling an electromechanical parking brake system of a vehicle.

BACKGROUND

Various electromechanical parking brake systems consisting of at least one brake mechanism unit and at least one control device are known from the prior art, with the actuation, in other words the applying and releasing of the brake mechanism unit for braking the vehicle, being controlled respectively by way of the at least one control device, preferably by actuating the brake mechanism unit by way of an electromechanical control element. The electromechanical parking brake system is preferably controlled by way of a simple operating element, for example a pushbutton, rocker switch or the like provided in the interior of the vehicle.

Such electromechanical parking brake systems are also configured for the static and in individual instances also the dynamic braking of a vehicle. In the case of the usual static braking in particular it is necessary for safety reasons for the vehicle to be almost stationary or its speed to be below a predefined speed threshold; in other words the static braking function is only provided by the electromechanical parking brake system when the speed is below the predefined speed threshold. If the vehicle speed is above the predefined speed threshold when the operating element is actuated, it is possible in some instances for dynamic braking of the vehicle to take place by means of the electromechanical parking brake system.

For static braking, a static application of the electromechanical parking brake system or brake mechanism unit is brought about at a high application speed by means of a, for example on-off, actuation of the operating element. In the case of a brake mechanism unit configured as a drum brake unit in particular such fast application results in a sudden deceleration of the vehicle due to the self-reinforcing effect of the drum brake present even at relatively low vehicle speeds. As well as an uncomfortable drive sensation, safety-critical drive situations can also result from the rapid braking of the vehicle. The brake mechanism unit is also subject to greater wear, which reduces its service life.

Electromechanical parking brake systems known from the prior art therefore have a fixed speed threshold of for example 3 km/h and if this is exceeded, the electromechanical parking brake system will not provide a static braking function. Alternatively, when the above-mentioned speed threshold is exceeded, the electromechanical parking brake system can be configured for dynamic braking. The dynamic braking function here directly follows the actuation of the operating element; in other words actuation of the operating element produces a preferably proportional dynamic braking force, while the brake is released directly when the operating element is released.

SUMMARY

According to various embodiments, the control of such an electromechanical parking brake system can be improved, in particular for static braking. According to an embodiment, in a method for controlling an electromechanical parking brake system of a vehicle, wherein the electromechanical parking brake system has at least one actuating element, at least one brake mechanism unit and at least one control device, the actuating element being actuated for the static braking of the vehicle and the at least one brake mechanism unit being applied at a predefined application speed in a controlled manner as a function of this by way of a control and evaluation routine executed in the control device, the vehicle speed prevailing on actuation of the at least one actuating element is determined and the application speed of the brake mechanism unit is selected as a function of the determined vehicle speed.

According to a further embodiment, the determined vehicle speed can be compared with at least one speed threshold and if the vehicle speed is below the speed threshold, the brake mechanism unit is actuated at a reduced application speed. According to a further embodiment, the speed threshold can be selected as a function of the actuation period of the operating element. According to a further embodiment, the speed threshold can be selected dynamically from a speed threshold range between 5 km/h and 15 km/h defined by a minimum and maximum speed threshold. According to a further embodiment, the application speed can be selected based on the characteristic curves assigned to the speed threshold below which the vehicle speed drops in each instance. According to a further embodiment, the amount of the application speed can be selected to be at least sectionally constant. According to a further embodiment, the application speed can be reduced by providing a number of application pauses, each of preferably identical temporal length. According to a further embodiment, when the vehicle speed is below the first speed threshold a static braking function can be provided and when it is above a second speed threshold, the brake mechanism unit can be released, the amount of the first speed threshold being greater than the amount of the second speed threshold. According to a further embodiment, in the event of new acceleration of the vehicle and/or an acceleration intention on the part of the driver, the brake mechanism unit can be released. According to a further embodiment, when a third speed threshold is exceeded, the amount of which is between the stationary state of the vehicle and the first and second speed thresholds, if the wheels are locked, the brake mechanism unit can be actuated according to a predefined application/release pattern. According to a further embodiment, the second speed threshold can be selected as a function of the temporal duration of the acceleration operation or as a function of the period for which the vehicle speed has been below the first speed threshold since the start of the application operation.

According to a further embodiment, in an electromechanical parking brake system comprising at least one actuating element, at least one brake mechanism unit and at least one control device, the actuating element being actuated for the static braking of a vehicle and the at least one brake mechanism unit being applied at a predefined application speed in a controlled manner as a function of this by way of a control and evaluation routine executed in the control device, the control and evaluation routine is configured to determine the vehicle speed prevailing on actuation of the at least one actuating element and to define an application speed for applying the brake mechanism unit as a function of the determined vehicle speed.

BRIEF DESCRIPTION OF THE DRAWINGS

The invention is described in more detail below with reference to an exemplary embodiment, based on figures, in which.

DETAILED DESCRIPTION

According to various embodiments, the vehicle speed prevailing on actuation of the at least one actuating element is determined and the application speed of the brake mechanism unit is selected as a function of the determined vehicle speed. This allows the static braking function to be provided particularly advantageously even at higher vehicle speeds compared with the prior art, in that the application speed provided for is reduced by up to 60%. The application speed is thus selected as a function of the vehicle speed prevailing on actuation of the parking brake, said vehicle speed being determined or calculated currently by means of corresponding characteristic curves by the control and evaluation routine. Sudden deceleration of the vehicle can be effectively prevented in this manner.

To this end the determined vehicle speed is advantageously compared with at least one speed threshold and if the speed is below the speed threshold, the brake mechanism unit is actuated at a reduced application speed.

According to a further embodiment, the speed threshold is selected as a function of the actuation period of the operating element.

The speed threshold is also advantageously selected dynamically from a speed threshold range between 3 km/h and 50 km/h, in particular 3 km/h and 30 km/h, defined by a minimum and maximum speed threshold.

Figure 1:
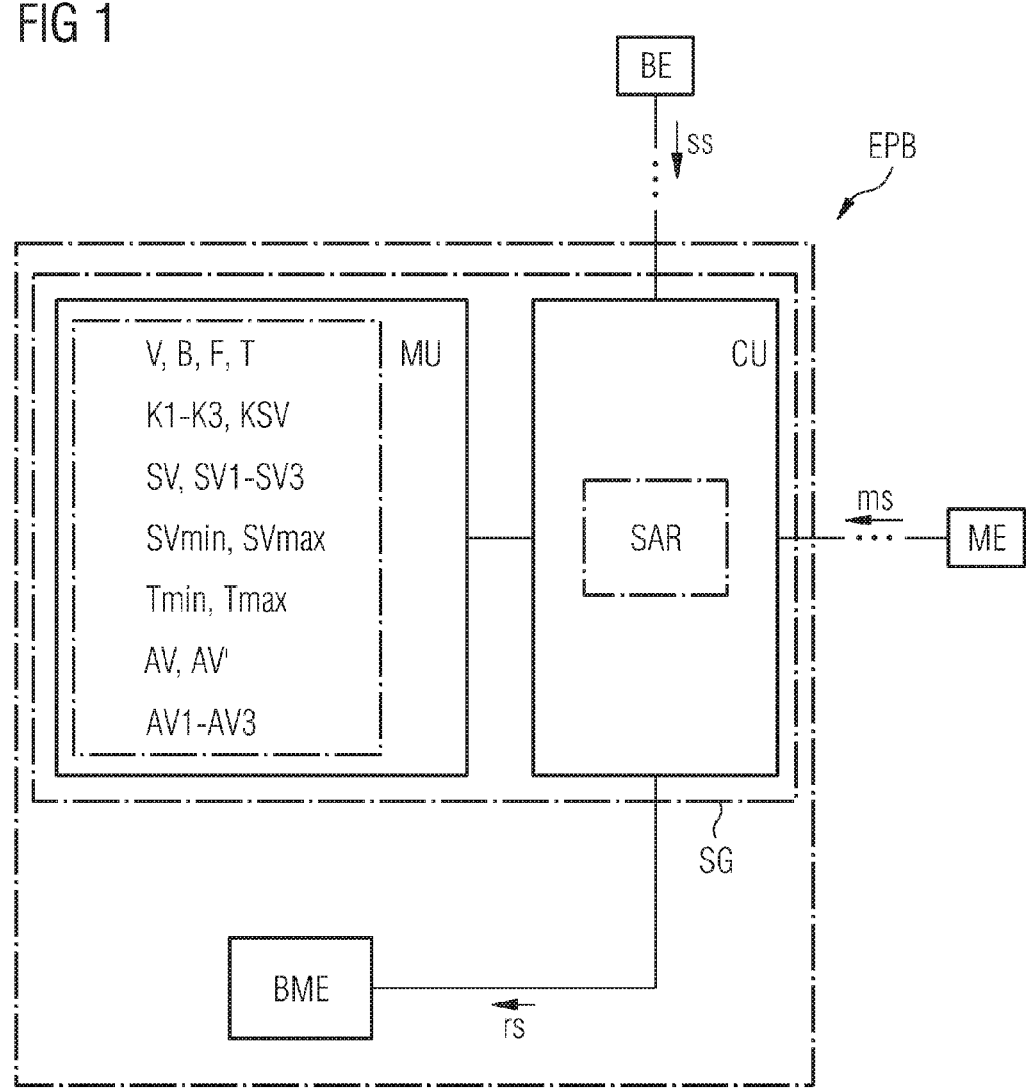
FIG. 1 shows by way of example a block circuit diagram of an electromechanical parking brake system.

FIG. 1 shows by way of example a schematic block circuit diagram of an electromechanical parking brake system EPB, which has a control device SG and a brake mechanism unit EPB connected thereto.

The control device SG comprises a control unit CU and a memory unit MU, with a control and evaluation routine SAR for controlling the electromechanical parking brake system EPB being executed in the control unit CU for the static or dynamic braking of a vehicle.

At least one operating element BE and a measuring unit ME are connected to the control device SG by way of a number of connection interfaces, for example wired or wireless interfaces or a bus system.

A switching signal ss is generated by manual actuation of the operating element BE and transmitted to the control unit CU. The switching signal ss is evaluated by the control and evaluation routine SAR and the control intention of the driver is determined as a function of the characteristic of the switching signal ss, said control intention being converted to at least one corresponding regulating signal rs, which is transmitted to the brake mechanism unit BME, to control the brake mechanism unit BME.

Actuation of the brake mechanism unit BME, in particular application of this at an application speed AV, then takes place according to the regulating signal rs. The application speed AV here reflects the response behavior of the electromechanical parking brake system EPB to actuation of the operating element BE by the driver. For example the control path x covered per unit of time t to actuate the brake mechanism unit BME and therefore the increase in the braking force F per unit of time t supplied by the electromechanical parking brake system EPB for example is set by way of the application speed AV.

The measuring unit ME serves to determine at least one measurement signal ms, which contains in particular information relating to the vehicle speed V or the acceleration B of the vehicle. The measurement signal ms is evaluated by the control and evaluation routine SAR and the current vehicle speed V or acceleration B at least is determined as a result.

The application speed AV of the brake mechanism unit BME is selected or calculated by the control and evaluation routine SAR as a function of the vehicle speed V of the vehicle prevailing on actuation of the operating element BE.

To this end the determined vehicle speed V is compared with at least a first speed threshold SV1 and if the speed is below the first speed threshold SV1 the brake mechanism unit BME is actuated at an assigned first application speed AV1, this being significantly below the application speeds in the static instance known from the prior art.

The first speed threshold SV1 here is above the 3 km/h known from the prior art, for example between 3 km/h and 50 km/h, in particular between 3 km/h and 30 km/h. When the vehicle speed V is below the first speed threshold SV1, a static braking function is provided by the electromechanical parking brake system EPB, but at a reduced first application speed AV according to various embodiments. For example a different application speed AV1-AV3 can be selected as a function of the amount by which the vehicle speed V is below the first speed threshold SV1. Alternatively a number of speed thresholds SV1-SV3 can be provided, to which a different application speed AV1-AV3 is respectively assigned.

Figure 2:
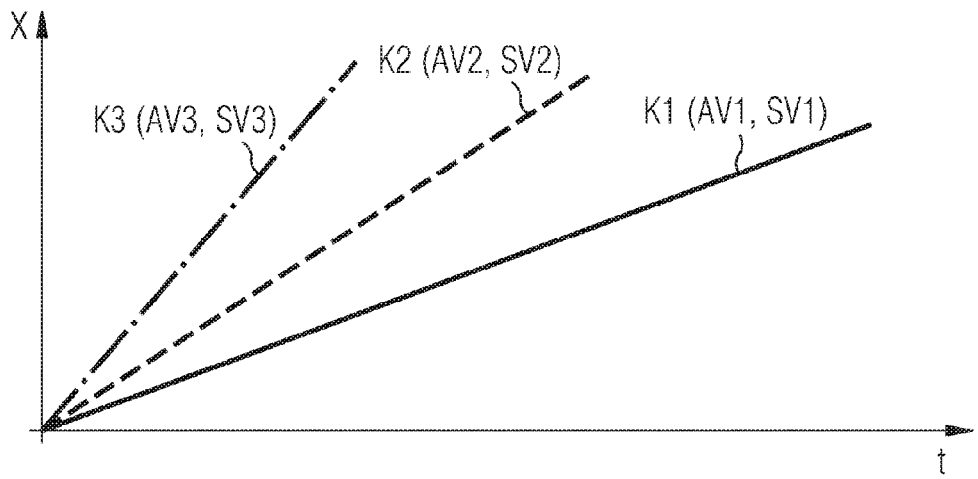
FIG. 2 shows by way of example a diagram of a number of characteristic curves for the speed-based determination of the application speed of the brake mechanism unit.
Figure 3:
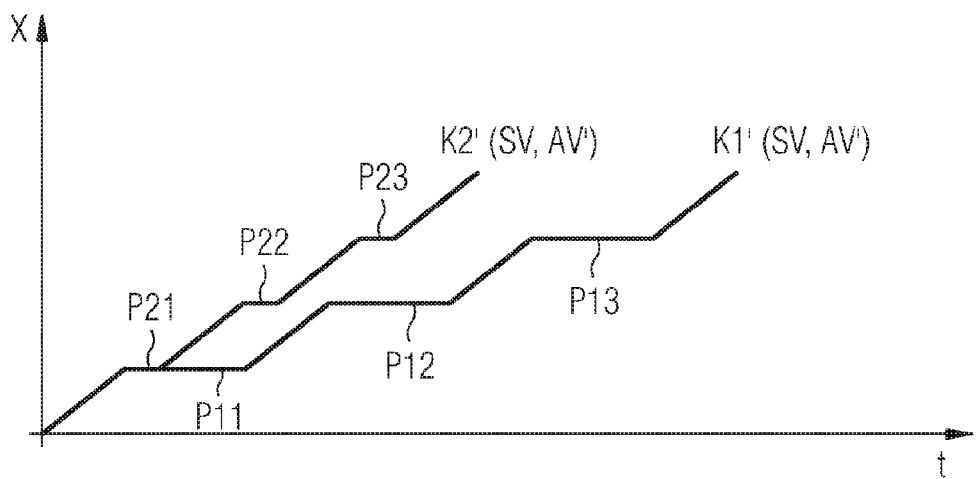
FIG. 3 shows by way of example a further diagram of two alternative characteristic curves for the speed-based determination of the application speed of the brake mechanism unit.

FIGS. 2 and 3 by way of example show diagrams of different characteristic curves K1-K3, with the time t being plotted in each instance along the horizontal axis (abscissa) of the diagram and the control path x for actuating the brake mechanism unit BME being plotted in each instance along the vertical axis (ordinate) of the diagram.

The gradient of the characteristic curves K1-K3 shown in the diagrams here reflects the amount of the application speed AV1-AV3, which can be selected as constant or sectionally constant by way of example.

Each of the characteristic curves K1-K3 here is assigned a speed threshold SV1-SV3 and when the vehicle speed is below said thresholds, the application speed AV1-AV3 predefined by the respective characteristic curve K1-K3 is selected to actuate the brake mechanism unit BME by way of the control and evaluation routine SAR.

Thus for example in the exemplary embodiment illustrated in FIG. 2 a first to third characteristic curve K1-K3 and therefore a first to third application speed AV1-AV3 are provided to actuate the brake mechanism unit BME.

The first characteristic curve K1 is assigned a first speed threshold SV1, the second characteristic curve K2 a second speed threshold SV2 and the third characteristic curve K3 a third speed threshold SV3, the amount of the first speed threshold SV1 being greater than the amount of the second speed threshold SV2 and this in turn being greater than the amount of the third speed threshold SV3.

FIG. 3 by way of example shows a first and second characteristic curve K1, K2, each having the same, sectionally constant application speed AV, i.e. the characteristic curves K1, K2 each have a number of application pauses P11, P12, P13 and P21, P22, P23, each of preferably identical temporal length, in which the brake mechanism unit BME is not actuated.

For example when the vehicle speed is below the first speed threshold SV1, the first characteristic curve K1 for controlling the brake mechanism unit BME is provided, in which the brake mechanism unit BME is actuated at the same application speed AV as in the case of the second characteristic curve K2 but the application pauses P11, P12, P13 are selected to be temporally significantly longer than the application pauses P21, P22, P23 of the second characteristic curve. When the vehicle speed is below the first speed threshold SV1, a slower response behavior of the electromechanical parking brake system EPB results than after a further reduction of the vehicle speed V below the second speed threshold SV2, i.e. the total application period of the braking operations in question varies. The amount of the first speed threshold SV1 here is again selected to be greater than the amount of the second speed threshold SV2.

The temporally significantly longer application period of the electromechanical parking braking system EPB means that during the application operation of the electromechanical parking brake system EPB it is possible for the driver to change decision and accelerate the vehicle again. To prevent unwanted braking of the vehicle by means of the electromechanical parking braking system EPB in such an instance, an activation range AB is predefined, which is defined in an upward direction by the first speed threshold SV1 and comprises the second speed threshold SV2.

Figure 4:
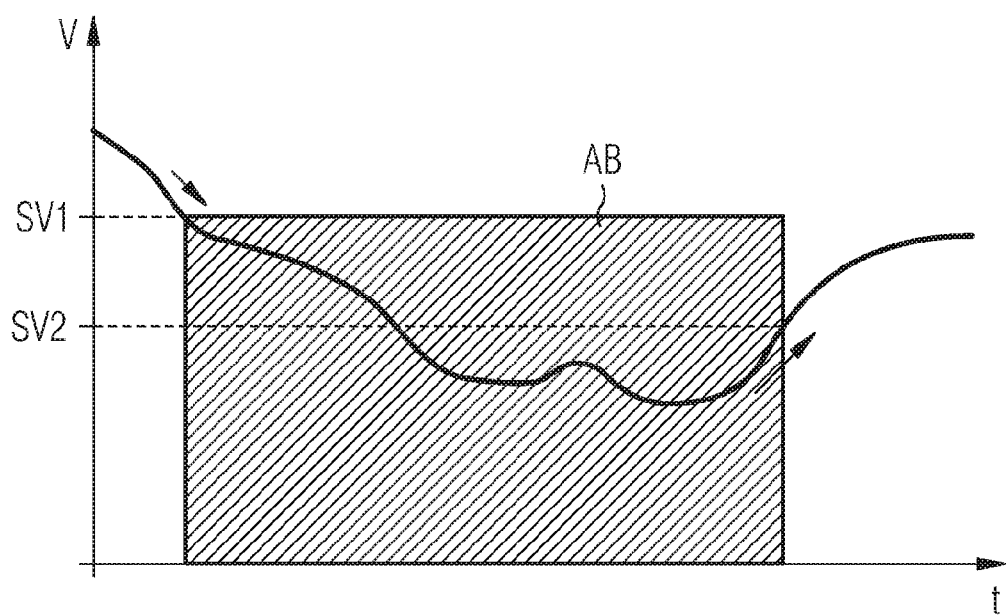
FIG. 4 shows by way of example a diagram of the speed pattern with an assigned activation range and FIG. 5 shows by way of example a diagram of a characteristic curve for the dynamic determination of a speed threshold.

FIG. 4 shows by way of example a diagram of a pattern of the speed V of a vehicle plotted over time t. The activation range AB defined in an upward direction by the first speed threshold SV1 is marked graphically here. When the current vehicle speed V is below the first speed threshold SV1, the activation range AB is entered, in other words a static braking function is provided by the electromechanical parking braking system EPB. If the driver now uses the operating element BE to actuate the electromechanical parking braking system EPB, the brake mechanism unit BME is applied at the first application speed AV1 assigned to the first speed threshold SV1. The vehicle speed V is reduced further and also drops below the second speed threshold SV2.

As soon as the driver actively accelerates and exceeds the second speed threshold SV2, the activation range AB is left, in other words actuation of the electromechanical parking braking system EPB is terminated. Additionally or alternatively actuation of the gas pedal or the currently prevailing engine torque can be detected by way of the measuring unit ME and can be evaluated by way of the control and evaluation routine SAR and a new acceleration of the vehicle can be detected as a result. The release operation is thus controlled for example by way of the engine torque of the drive system and the brake mechanism unit BME is only released when a predefined engine torque threshold and/or gas pedal threshold is exceeded.

The second speed threshold SV2 can also be selected as a function of the temporal duration of the acceleration operation or as a function of the period for which the vehicle speed has been below the first speed threshold SV1 since the start of the application operation.

A speed threshold range between 5 km/h and 15 km/h can also be predefined. The evaluation and control routine SAR is used to select an assigned speed threshold SV from the speed threshold range as a function of the actuation period T of the operating element BE, said assigned speed threshold SV being used for further control of the electromechanical parking braking system EPB. The amount of the speed threshold SV preferably increases as actuation of the operating element BE increases over time.

Figure 5:
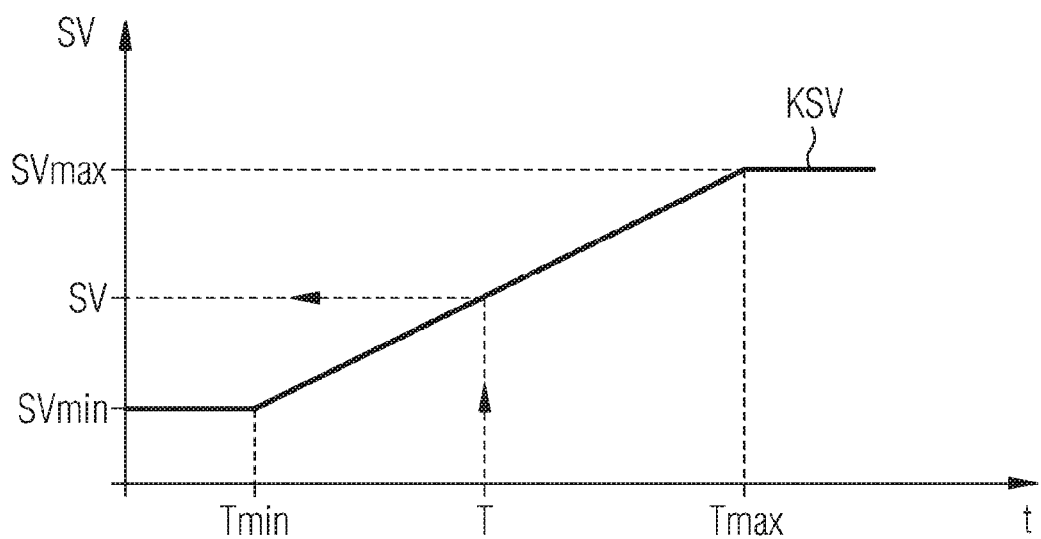

FIG. 5 shows by way of example a diagram of a characteristic curve KSV for the dynamic determination of the speed threshold SV as a function of the actuation period T of the operating element. The characteristic curve KSV is defined by a minimum and maximum speed threshold SVmin, SVmax, for the selection of which a minimum actuation period Tmin or a maximum actuation period Tmax is required. In the case of an actuation period T between the minimum and maximum actuation periods Tmin, Tmax a speed threshold SV determined by the pattern of the characteristic curve KSV is selected.

When a third speed threshold SV3 is exceeded, the amount of which is between the stationary state of the vehicle and the first and second speed thresholds SV1, SV2, if the wheels are locked, a predefined application/release pattern can advantageously be provided, by way of which the electromechanical parking braking system EPB is alternately released and applied again, without further actuation of the operating element BE being required.

The invention has been described above with reference to an exemplary embodiment. It goes without saying that numerous changes and modifications are possible without departing from the concept underlying the invention.

LIST OF REFERENCE CHARACTERS

AB Activation range
AV Application speed
AV1 First application speed
AV2 Second application speed
AV3 Third application speed
B Acceleration
BE Operating element
BME Brake mechanism unit
CU Control unit
EPB Electromechanical parking braking system
KS1-KS3, KSV Characteristic curves
ME Measuring unit
Ms Measurement signal
MU Memory unit
P11, P12, P13 Application pauses
P21, P22, P23 Application pauses
rs Regulating signal
SAR Control and evaluation routine
SG Control device
ss Switching signal
SV3 Third speed threshold
SV1 First speed threshold
SV2 Second speed threshold
SVmax Maximum speed threshold
SVmin Minimum speed threshold
t Time
tmax Maximum actuation period
tmin Minimum actuation period
V Speed
x Control path

What is claimed is:

1. A method for controlling an electromechanical parking brake system of a vehicle, wherein the electromechanical parking brake system includes at least one actuating element, at least one brake mechanism unit and at least one control device, the method comprising:
   automatically activating the at least one brake mechanism unit in response to a speed of the vehicle falling below an activation threshold,
   while the brake mechanism unit is activated, receiving a braking request from a user via the at least one actuating element, and in response to the braking request, applying the at least one brake mechanism unit at a predefined application speed in a controlled manner using a control and evaluation routine executed in the control device,
   determining the vehicle speed prevailing on actuation of the at least one actuating element,
   selecting the application speed of the brake mechanism unit as a function of the determined vehicle speed, and
   automatically deactivating the at least one brake mechanism unit in response to the speed of the vehicle increasing above a predetermined deactivation threshold that is lower than the activation threshold.

2. The method according to claim 1, further comprising selecting the application speed of the brake mechanism unit such that a greater application speed is selected for a lower vehicle speed.

3. The method according to claim 1, wherein the activation threshold is selected as a function of a duration of user actuation of the actuating element.

4. The method according to claim 1, wherein the activation threshold is selected dynamically from a speed threshold range between 5 km/h and 15 km/h defined by a minimum and maximum speed threshold.

5. The method according to claim 1, wherein the application speed is selected based on a characteristic curve assigned to the activation threshold.

6. The method according to claim 5, wherein the amount of the application speed is selected to be at least sectionally constant.

7. The method according to claim 1, wherein the application speed is reduced by providing a number of application pauses.

8. The method according to claim 1, wherein in the event of new acceleration of the vehicle or an acceleration intention on the part of the driver, the brake mechanism unit is released.

9. The method according to claim 1, wherein the deactivation threshold is selected as a function of a duration during which the vehicle speed has been below the activation threshold since the start of user actuation of the actuating element.

10. An electromechanical parking brake system comprising:
   at least one actuating element,
   at least one brake mechanism unit, and
   at least one control device configured to:
      automatically activate the at least one brake mechanism unit in response to a speed of the vehicle falling below a first speed threshold,
      receive a signal from an the actuating element for the static braking of a vehicle while the brake mechanism unit is activated, and in response, execute a control and evaluation routine to apply the at least one brake mechanism unit at a predefined application speed in a controlled manner, wherein the control and evaluation routine is configured to determine the vehicle speed prevailing on actuation of the at least one actuating element and to define an application speed for applying the brake mechanism unit as a function of the determined vehicle speed, and
      automatically deactivate the at least one brake mechanism unit in response to the speed of the vehicle increasing above a second speed threshold lower than the first speed threshold.

11. A system for controlling an electromechanical parking brake system of a vehicle, comprising:
   at least one actuating element,
   at least one brake mechanism unit, and
   at least one control device,
   wherein the system is configured to:
      automatically activate the at least one brake mechanism unit in response to a speed of the vehicle falling below an activation threshold,
      upon receiving a braking request from a user via the at least one actuating element while the at least one brake mechanism unit is activated:
         determine the vehicle speed prevailing on actuation of the at least one actuating element,
         select the application speed of the brake mechanism unit as a function of the determined vehicle speed, and
         apply the at least one brake mechanism unit the selected application speed, and
      automatically deactivate the at least one brake mechanism unit in response to the speed of the vehicle increasing above a predetermined deactivation threshold that is lower than the activation threshold.

12. The system as claimed in claim 11, wherein the system is configured to select the application speed of the brake mechanism unit such that a greater application speed is selected for a lower vehicle speed.

13. The system as claimed in claim 11, wherein the activation threshold is selected as a function of a duration of user actuation of the actuating element.

14. The system as claimed in claim 11, wherein the activation threshold is selected dynamically from a speed threshold range between 5 km/h and 15 km/h defined by a minimum and maximum speed threshold.

15. The system as claimed in claim 11, wherein the application speed is selected based on a characteristic curve assigned to the activation threshold.

16. The system as claimed in claim 15, wherein the amount of the application speed is selected to be at least sectionally constant.

17. The system as claimed in claim 11, wherein the application speed is reduced by providing a number of application pauses.

* * * * *